(12) United States Patent
Yamamoto et al.

(10) Patent No.: US 8,299,686 B2
(45) Date of Patent: Oct. 30, 2012

(54) ACTUATOR WITH SENSOR

(75) Inventors: Jun Yamamoto, Tokyo (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 12/858,255

(22) Filed: Aug. 17, 2010

(65) Prior Publication Data
US 2011/0050041 A1    Mar. 3, 2011

(30) Foreign Application Priority Data

Aug. 27, 2009 (JP) ................................. 2009-197415

(51) Int. Cl.
*H01L 41/00* (2006.01)
(52) U.S. Cl. .......................... 310/338; 310/300; 310/359
(58) Field of Classification Search .................. 310/300, 310/338, 359
See application file for complete search history.

(56) References Cited

U.S. PATENT DOCUMENTS
2006/0257645 A1 * 11/2006 Asaka et al. .................. 428/323

FOREIGN PATENT DOCUMENTS
| JP | 2005-039995 A | 2/2005 |
| JP | 2006-173219 A | 6/2006 |
| JP | 2007-318960 A | 12/2007 |
| JP | 2008-211938 A | 9/2008 |
| WO | WO 2005/013819 A1 * | 2/2005 |

* cited by examiner

*Primary Examiner* — Thomas M Dougherty
(74) *Attorney, Agent, or Firm* — Canon U.S.A., Inc., IP Division

(57) ABSTRACT

An actuator with a sensor, including an actuator having a pair of electrodes and an ionic conduction layer present between the pair of electrodes, and a sensor having electrodes and an electromechanical conversion element. When the actuator is deformed, the sensor is also deformed. The relationship between the modulus of elasticity (A) of the actuator and the modulus of elasticity (S) of the sensor satisfies S<A.

9 Claims, 7 Drawing Sheets

ACTUATOR WITH SENSOR

BACKGROUND OF THE INVENTION

1. Field of the Invention

The present invention relates to an actuator with a sensor in which a sensor for obtaining information on displacement or position is provided.

2. Description of the Related Art

In order to improve the controllability of a polymer actuator, it is important to detect information on displacement or position of the polymer actuator.

Japanese Patent Application Laid-Open No. 2007-318960 has proposed a method in which electrodes of a polymer actuator composed of an ionic conductor layer are divided, and part of the electrodes are used as a sensor. This method utilizes such a phenomenon that when a polymer membrane formed of an ionic conductor is pressurized or stretched, a potential is developed on the surface of the polymer membrane to generate voltage.

According to the above-described construction, information on the displaced state or position of the polymer actuator can be detected by checking a value detected by the sensor against the action of the polymer actuator.

SUMMARY OF THE INVENTION

However, the above prior art example involves the following problems.

In Japanese Patent Application Laid-Open No. 2007-318960, the polymer actuator and sensor are formed of the same materials, and input and output of electric signals are different. The sensor detects shape change of the sensor itself following the action of the polymer actuator.

When these polymer actuator and sensor have been integrated, the presence of the sensor has obstructed the action of the polymer actuator. However, any effective technical idea for reducing this obstruction to the action has not been disclosed.

If the displacement of the polymer actuator is small, the displacement of the sensor itself is also small, so that the detection sensitivity thereof has not been always high. In order to improve controllability, it is necessary to construct a sensor capable of detecting minute variation of the polymer actuator. However, any effective technical idea for such construction has not been disclosed.

In view of the above-described problems, the present invention provides an actuator with a sensor in which an actuator and a sensor that causes shape change following the action of the actuator are integrated, wherein the action efficiency of the actuator is improved, and the detection sensitivity of the sensor is improved.

In a first aspect of the present invention, there is provided an actuator with a sensor, comprising an actuator having a pair of electrodes and an ionic conduction layer present between the pair of electrodes, and a sensor having electrodes and an electromechanical conversion element, wherein when the actuator is deformed, the sensor is also deformed, and wherein the relationship between the modulus of elasticity (A) of the actuator and the modulus of elasticity (S) of the sensor satisfies S<A.

In a second aspect of the present invention, there is provided an actuator with a sensor, comprising an actuator having a pair of electrodes and an ionic conduction layer present between the pair of electrodes, a sensor having electrodes and an electromechanical conversion element, and a connecting portion provided between the actuator and the sensor for connecting the actuator to the sensor, wherein when the actuator is deformed, the connecting portion and the sensor are also deformed, and wherein the relationship among the modulus of elasticity (A) of the actuator, the modulus of elasticity (S) of the sensor and the modulus of elasticity (I) of the connecting portion satisfies S<I<A, S=I<A, S<I=A, or I<S<A.

According to the present invention, there can be provided an actuator with a sensor in which when the actuator is deformed, the sensor is also deformed, the action efficiency of the actuator is improved, and the detection sensitivity of the sensor is improved.

In particular, obstruction to the action of the actuator by the presence of the sensor can be reduced to improve the action efficiency of the actuator. In addition, the detection sensitivity of the sensor can be improved by more accelerating shape change of the sensor.

Further features of the present invention will become apparent from the following description of exemplary embodiments with reference to the attached drawings.

DESCRIPTION OF THE EMBODIMENTS

Figure 1A:
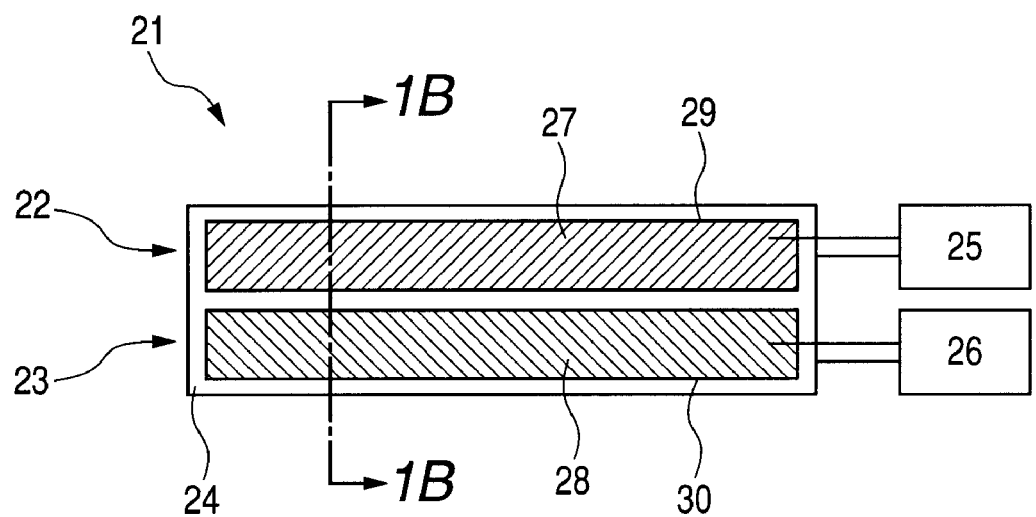
FIGS. 1A and 1B illustrate the construction of an actuator with a sensor according to an embodiment of the present invention.

Preferred embodiments of the present invention will now be described in detail.

An actuator with a sensor according to the present invention has an actuator having a pair of electrodes and an ionic conduction layer present between the pair of electrodes, and a sensor having electrodes and an electromechanical conversion element, wherein when the actuator is deformed, the sensor is also deformed, and wherein the relationship between the modulus of elasticity (A) of the actuator and the modulus of elasticity (S) of the sensor satisfies S<A.

The reason why the sensor is also deformed when the actuator is deformed is that the actuator and the sensor are integrated. Being integrated means that the actuator and the sensor are provided on the same main surface of a frame. It may also mean that the actuator and the sensor are provided on the front and back surfaces of the frame, respectively, or that holes are made in the frame and the actuator and the sensor are provided in the holes. It may further mean that the actuator, the frame and the sensor are laminated in this order.

The actuator with the sensor according to the present invention includes the following embodiments (1) and (2).

(1) Embodiment in which a Connecting Portion is Provided Between an Actuator and a Sensor The actuator with the sensor according to this embodiment has an actuator having electrodes and an ionic conduction layer, a sensor having electrodes and an electromechanical conversion element, and a connecting portion provided between the actuator and the sensor for connecting the actuator to the sensor, wherein when the actuator is deformed, the connecting portion and the sensor are also deformed, and wherein the relationship among the modulus of elasticity (A) of the actuator, the modulus of elasticity (S) of the sensor and the modulus of elasticity (I) of the connecting portion satisfies S<I<A, S=I<A, S<I=A, or I<S<A.

(1-1): In this actuator with the sensor, it is favorable that the actuator having the electrodes and the ionic conduction layer and the sensor having the electrodes and the electromechanical conversion element are connected in parallel through the connecting portion provided between the actuator and the sensor.

(1-2): In this actuator with the sensor, it is also favorable that the actuator having the electrodes and the ionic conduction layer and the sensor having the electrodes and the electromechanical conversion element are laminated and connected through the connecting portion provided between the actuator and the sensor.

(2) Embodiment in which an Actuator and a Sensor are Directly Laminated

The actuator with the sensor according to this embodiment has an actuator having electrodes and an ionic conduction layer, and a sensor having electrodes and an electromechanical conversion element, the actuator and the sensor being directly laminated, wherein when the actuator is deformed, the sensor is also deformed, and wherein the relationship between the modulus of elasticity (A) of the actuator and the modulus of elasticity (S) of the sensor satisfies S<A.

The actuators with the sensor will be described with reference to the attached drawings.

Figure 1B:
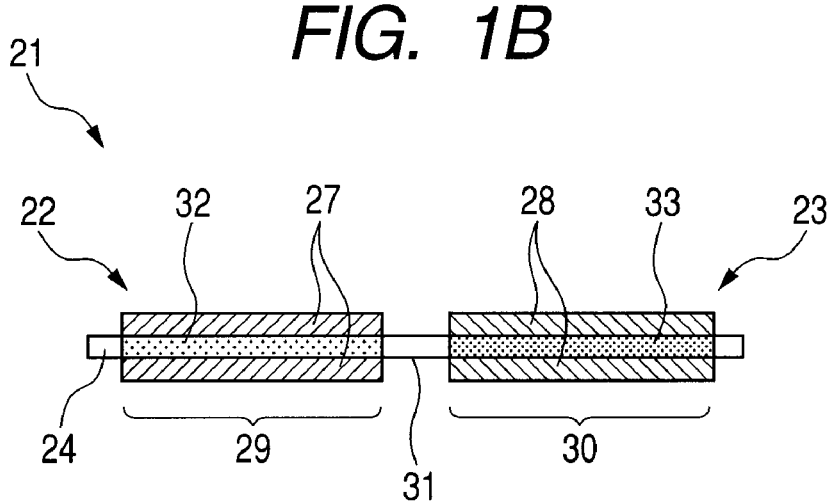

FIGS. 1A and 1B illustrate the construction of an actuator with a sensor according to an embodiment of the present invention, in which FIG. 1A is an illustration viewed from the top, and FIG. 1B is a cross-sectional view taken along line 1B-1B in FIG. 1A.

The actuator with the sensor illustrated in FIGS. 1A and 1B is that according to the embodiment (1), in which an actuator and a sensor that causes shape change following the action of the actuator are integrally formed through a connecting portion provided between the actuator and the sensor. In this construction, the flexibility of a sensor region is more enhanced than that of an actuator region.

In FIGS. 1A and 1B, are illustrated an actuator with a sensor 21, an actuator 22, a sensor 23, a frame 24 representing the connecting portion, an electric signal input unit 25, an electric signal detection unit 26, actuator electrodes 27, sensor electrodes 28, an actuator region 29, a sensor region 30, an interlayer region 31, an ionic conduction layer (actuator polymer membrane) 32, and an electromechanical conversion element 33.

In the actuator with the sensor according to the present invention, at least parts of the polymer actuator 22 and the sensor 23 are connected to each other through on membrane surfaces of the respective ionic conduction layer and electromechanical conversion element 33. In this embodiment, they are connected and formed so as to share a part of the frame 24 forming the connecting portion.

The actuator 22 and the sensor 23 have such a construction that two or more electrodes are arranged on respective membrane surfaces of the ionic conduction layer and the electromechanical conversion element 33, and input and output directions of electric signals are different.

The actuator 22 is connected to the electric signal input unit 25 through a lead wire connected to an electrode portion. The electric signal input unit 25 is a unit for applying voltage or current to the actuator 22, and the actuator 22 exhibits shape change by such electric input to conduct bending or stretching motion.

When the actuator 22 moves to change its shape, stress is generated in the membrane thereof. The frame has a role of transmitting this stress to the sensor 23, and the sensor 23 changes its shape by the transmission of the stress. The sensor 23 is connected to the electric signal detection unit 26 through a lead wire connected to an electrode portion.

The electric signal detection unit 26 detects output variation of an electric signal when the sensor 23 changes its shape following the shape change of the actuator 22.

The relationship between position information as to the motion of the actuator 22 and the detection value of the sensor 23 is grasped in advance, whereby the displaced state of the actuator 22 can be calculated from the output variation of the electric signal detected from the sensor 23.

The actuator with the sensor according to the present invention has such a feature that in comparison of flexibility between an actuator region 29 in which the actuator 22 has been formed, and a sensor region 30 in which the sensor 23 has been formed the sensor region 30 is more flexible than the actuator region 29, i.e., the relationship between the modulus of elasticity (A) of the actuator and the modulus of elasticity (S) of the sensor satisfies S<A.

By adopting the above-described construction, the sensor 23 changes its shape more submissively upon the action of the actuator 22, so that obstruction to the action of the actuator 22 by the presence of the sensor 23 can be more lessened.

When the shape of an actuator with a sensor having a distribution of flexible and rigid portions in its plane is changed, stress of strain easily concentrates on flexible portions. Thus, even when the action of the actuator 22 is small, greater stress is concentrated on the sensor 23 to easily cause strain by adopting the construction of the present invention, whereby the detection sensitivity of the sensor 23 can be improved.

The respective materials and constructions of the actuators with the sensor will hereinafter be described in detail.

Construction of Actuator

The actuator 22 used in the present invention is favorably a polymer actuator. In the following description, examples using the polymer actuator are described.

The polymer actuator may be formed of any material such as an ion conductive polymer, an electrically conductive polymer or an electroactive polymer. The polymer actuator is favorably an actuator which outputs displacement against input of an electric signal and, at the same time, is usable as a sensor which outputs an electric signal against input of displacement. Among others, an ion conductive polymer actuator is favorable because it is driven by a low voltage, and a relatively fast response speed is achieved.

In the ion conductive polymer actuator, electrodes 27 containing a conductive material and an ionic substance are formed on both surfaces of an ionic conduction layer 32 containing an ionic substance. The respective layers have flexibility and are formed into a rectangle.

In the structure where both electrodes are held so as to face each other as illustrated in FIGS. 1A and 1B, the whole actuator exhibits a bending action upon application of a voltage. The construction of the ionic conduction layer and the arrangement of the electrodes are designed, whereby the actuator can also exhibit a stretching or twisting action.

The polymer actuator 22 may selectively have any form such as a circular, triangular, elliptical or rod-like flat plate, film, cylinder, helix or coil form in addition to the form of the rectangular flat plate.

The polymer actuator 22 may adopt a composite structure composed of single or plural elements.

Components of Polymer Actuator

Typical materials for members making up the polymer actuator 22 will be described.

<Ionic Conduction Layer>

The ionic conduction layer 32 is formed of a flexible material containing an ionic substance, which is a nonionic polymeric compound or an ion conductive polymeric compound. In such a material, an ion serves as a charge carrier when current is caused to flow by charge transfer under the electric field.

Examples of the nonionic polymeric compound include fluorine-containing polymers such as tetrafluoroethylene and polyvinylidene fluoride; polyolefin polymers such as polyethylene and polypropylene; polybutadiene compounds; polyurethane compounds such as elastomers and gels; silicone compounds; thermoplastic polystyrene; polyvinyl chloride; and polyethylene terephthalate. These compounds may be used either singly or in any combination thereof, and may be functionalized or copolymerized with another polymer.

As examples of the ionic substance contained in these nonionic polymeric compounds, may be mentioned lithium fluoride, lithium bromide, sodium bromide, magnesium chloride, copper sulfate, sodium acetate, sodium oleate and sodium acetate.

As the ionic substance, an ionic liquid is favorably used because durability in action in the air is improved.

Here, the ionic liquid is also called an ordinary-temperature molten salt or simply a molten salt and is a salt exhibiting a molten state in a wide temperature range including ordinary temperature (room temperature), for example, a salt exhibiting a molten state at 0° C., favorably −20° C., more favorably −40° C. The ionic liquid favorably has high ionic conductivity.

Any of various publicly known salts may be used as the ionic liquid, and a cheap salt exhibiting a liquid state in an actual service temperature range is favorable. Favorable examples of the ionic liquid include imidazolium salts, pyridinium salts, ammonium salts and phosphonium salt. These salts may be used either singly or in any combination thereof.

As the ion conductive polymeric compound, may be used a polycation or polyanion. As examples of the polyanion, may be mentioned those obtained by introducing a sulfonic group (—$SO_3H$), carboxyl group (—COOH) or phosphoric group as an anionic functional group into a publicly known polymer having such a basic skeleton as polyethylene, polystyrene, polyimide or polyarylene (aromatic polymer); and perfluorosulfonic polymers, perfluorocarboxylic polymers and perfluorophosphoric polymers obtained by introducing an anionic functional group such as a sulfonic group, carboxyl group or phosphoric group into a skeleton of a fluorine-containing polymer.

A perfluorosulfonic acid/PTFE (polytetrafluoroethylene) copolymer (Flemion (trademark, product of Asahi Glass Co., Ltd., or Nafion (trademark, product of Du Pont Co.)) may be favorably used.

As examples of the polycation, may be mentioned those obtained by introducing a sulfonium group, ammonium group or pyridinium group as a cationic functional group into a publicly known polymer such as polyethylene, polystyrene, polyimide or polyarylene (aromatic polymer).

These ion conductive polymeric compounds are required to be in a water-containing state at the time a voltage is applied to cause movement. The state may also be a state of containing an ionic liquid in place of water.

When the ion conductive polymeric compound is a polyanion, the counter cation of the anionic functional group is favorably replaced with $Li^+$, $Na^+$, $K^+$ or alkylammonium ions.

When the ion conductive polymeric compound is a polycation, the counter anion of the cationic functional group is favorably replaced with $F^-$, $Cl^-$, $Br^-$, an aromatic or aliphatic sulfone, an aromatic or aliphatic carboxylic acid, or an aromatic or aliphatic phosphoric acid.

<Electrode>

The electrodes 27 are favorably flexible electrodes formed of a composite of a conductive material and a polymeric material (polymer binder), or flexible thin-layer electrodes formed of a conductive material.

No particular limitation is imposed on the conductive material so far as actuator performance is not adversely affected. However, examples thereof include various kinds of carbon materials such as graphite, carbon black, carbon whiskers, carbon fibers, carbon nanotubes and carbon microcoils; powders (fine particles) of metals (gold, platinum, palladium, silver, iron, cobalt, nickel, copper, titanium and aluminum); metallic compounds (tin oxide, zinc oxide, indium oxide and ITO); metallic fibers; conductive ceramic materials; and conductive polymer materials. The electrode layer contains one of these conductive materials or a mixture thereof.

Among these, carbon materials having a nano-structure are favorable from the viewpoints of conductivity and specific surface area, and carbon nanotubes (CNTs) are particularly favorable. CNT gels formed from a carbon nanotube and an ionic liquid is extremely favorable as an electrode material because it has such an advantage that a bundle of CNT is gelled by self-organization with the ionic liquid to effectively disperse CNT.

No particular limitation is imposed on the polymer binder contained in the electrode 27 so far as it has sufficient flexibility to follow the action of the actuator. However, the binder favorably has a low hydrolyzability and is stable in the air.

As the material for such a polymer binder, may be used any of the materials mentioned for the ionic conductor membrane. A conductive polymer may also be used. No particular limitation is imposed on such a polymer. However, as examples thereof, may be mentioned polyaniline, polypyrrole, polythiophene, polyacetylene and polyphenylene. Incidentally, these materials may be used either singly or in any combination thereof, and may be functionalized or copolymerized with another polymer.

The polymer binder is favorably a polymer having high compatibility with the ionic conduction layer 32. High compatibility and bonding ability with respect to the ionic conduction layer 32 enables formation of an electrode 27 firmly and closely bonded. For this reason, the polymer binder is favorably a polymer having a polymer structure that is the same as, similar to or identical to that of the polymeric compound forming the ionic conduction layer 32, or a polymer having a functional group that is the same as, similar to or identical to that of the polymeric compound forming the ionic conduction layer 32.

The electrode 27 may be formed as a thin metal layer by plating, vapor deposition or sputtering. When such an electrode is formed directly on the ionic conduction layer, the electrode 27 may be regarded as being formed of a conductive material alone. Such a thin metal layer can contribute to improvement in conductivity in an in-plane direction of the electrode.

Production Process of Actuator

No particular limitation is imposed on a production process of the ionic conduction layer 32 used in the present invention. An example where the ionic conduction layer 32 is formed from a nonionic polymeric compound and an ionic liquid is described. Examples of a process for producing such an ionic conduction layer include a process in which an ionic liquid and a polymer component are mechanically kneaded under heat and then formed; a process in which after an ionic liquid and a polymer component are dissolved in a proper solvent, the solvent is removed, and the remainder is then formed; a process in which a polymer component is impregnated with an ionic liquid, and the resultant impregnated product is then formed; and a process in which a monomer used in preparation of a polymer component is caused to react in the presence of a polymerization initiator in the ionic liquid, and the resultant reaction product is then formed. The production process may be suitably selected from these processes in accordance with end applications intended.

As the solvent in the process in which after the ionic liquid and the polymer component are dissolved in the proper solvent, the solvent is removed, may be used, for example, tetrahydrofuran (THF), methyl ethyl ketone, N-methyl-2-pyrrolidone or dimethylacetamide (DMAc).

No particular limitation is also imposed on a production process of the electrode 27 used in the present invention. For example, the electrode 27 can be formed in the same manner as that for the ionic conduction layer except that a conductive material is added in forming the ionic conduction layer 32.

The ionic conduction layer 32 and electrodes 27 thus obtained may be uniformly cut into any shape and size. No particular limitation is imposed on a process for forming the polymer actuator 22. However, a process, in which the electrodes 27 are arranged on both sides of the ionic conduction layer 32 so as to hold the ionic conduction layer between the electrodes followed by subjecting them to heat-pressing (hot-pressing or heat-bonding under pressure) may favorably be used.

No particular limitation is imposed on the temperature, pressing pressure and time in the heat pressing so far as the temperature is lower than a decomposition temperature of the polymer binder, and these conditions may be suitably selected according to the polymer binder used, the polymeric compound forming the actuator and the kind of the ion transferred. For example, the temperature of the heat pressing is favorably from 30 to 150° C. The pressing pressure is favorably from 1 to 100 $kg/cm^2$, more favorably from 10 to 50 $kg/cm^2$.

A process in which thin metal layers are formed on both surfaces of the ionic conduction layer 32 by plating, vapor deposition or sputtering may also be used.

When water, an ionic substance, an ionic liquid or a mixture thereof is caused to be contained in the polymer actuator 22 after the production of a device, it is only necessary to impregnate the polymer actuator with a solution thereof. Here, no particular limitation is imposed on the concentration of the solution impregnated and impregnation time, and any conventionally known method may be used.

Drive of Polymer Actuator

Both electrodes 27 on the polymer actuator 22 are connected to an electric signal input unit 25 through an electrode fixing terminal and a lead wire (both not illustrated). The electric signal input unit 25 applies a voltage or current between the electrodes of the polymer actuator 22 to give a potential difference, thereby bringing about a shape change on the polymer actuator 22.

In the polymer actuator having an electrode/ionic conduction layer/electrode structure, a volume difference occurs between the two electrodes resulting from the intralayer transfer of the ionic conductor caused by the potential difference. In the case of containing, for example, an ionic liquid, an anion and a cation making up the ionic liquid are attracted to a plus electrode and a minus electrode, respectively. These anion and cation are different in ion size from each other, and this difference in ion size is one of the causes for the volume difference between the electrodes.

The whole polymer actuator comes to exhibit such bending motion as to become flexed toward one of the electrodes attending on such a change in shape or volume between the electrodes.

Since the transfer quantity and transfer speed of the ionic conductor vary according to the value of a voltage or current applied between both electrodes, the displacement quantity and displacement speed in the bending motion of the polymer actuator can be controlled by electrical control. The direction of the bending motion can also be controlled by changing the polarity of the voltage applied or the direction of the current.

In the ion conductive type polymer actuator, a bending action can be conducted by applying a low voltage of the order of from 0.1 to 10 V to between both electrodes. In the case of using an ionic liquid, deterioration can be inhibited by applying a voltage within a range not exceeding the potential window of the ionic liquid. In the case of using a general ionic liquid, the voltage applied is favorably 4 V or less.

The electric signal input unit 25 applies a direct voltage (current) or an alternating voltage (current) to the polymer actuator 22. Input of these electric signals can be application with a constant value, linear sweeping, or any waveform such as square wave or sine wave. It may also be possible to control the reference or amplitude of the signal. Further, the input time of the signal and the duty cycle of the signal waveform may be arbitrarily set. In addition, such a change-over unit on a circuit as to change the polarity of an electrode and a short-circuit unit for short-circuiting between electrodes may be provided.

The electric signal input unit 25 has such a control mechanism as to obtain information on displacement or position from the value detected by the sensor 23 to suitably change the input signal to the polymer actuator 22 based on the information. It is thereby possible to conduct a more soft and compatible action based on the motion state of the polymer actuator 22.

An external sensor for detecting distance from or contact state with an object may be provided in the actuator with the sensor separately from the sensor 23.

The electric signal input unit may have such a control mechanism as to suitably change the input signal to the polymer actuator 22 based on the information on the distance from or the contact state with the object detected by the external sensor.

(Construction of Sensor)

In the present invention, the sensor 23 has an electromechanical conversion element 33 and two electrodes 28 arranged on the electromechanical conversion element 33. The sensor 23 may be any sensor so far as it can output change of an electric signal against input of displacement.

When an ionic conductor membrane or dielectric membrane is used as the electromechanical conversion element 33, a potential is developed on the surface of the polymer membrane by pressurization or stretching to generate voltage, so that such a membrane is favorable as a sensor material.

When the ionic conductor membrane is used for the electromechanical conversion element 33, the material may be selected from the previously described components of the ionic conduction layer in the polymer actuator 22, and the same material as that used in the polymer actuator 22 may be used. When the same material as that used in the polymer actuator 22 is used, there is an advantage in cost and productivity.

Likewise, the material of the electrodes 28 may also be selected from the components of the electrodes in the polymer actuator 22.

The sensor 23 changes its shape following the shape change of the polymer actuator 22. Any of various kinds of publicly known sensor elements may be used as the material of the electromechanical conversion element 33 in addition to the ionic conductor membrane and dielectric membrane so far as it satisfies the relationship of modulus of elasticity (flexibility) between the actuator region and the sensor region. As such a sensor element used as the material of the electromechanical conversion element, may favorably be mentioned pressure-sensitive conductive rubbers obtained by mixing conductive particles formed of carbon, metal or the like into a polymeric base material such as silicone rubbers. Two or more electrodes are provided on the pressure-sensitive conductive rubber, and a resistance between the electrodes is detected, whereby such a pressure-sensitive conductive rubber may be used as the sensor. In a sensor formed of such a pressure-sensitive conductive rubber, distance or adhesion between the conductive particles in the interior thereof is changed upon deformation of the base material, thereby changing output of resistance values as a sensor element. The electrodes may be arranged so as to hold the pressure-sensitive conductive rubber between them or may be arranged side by side on one side of the pressure-sensitive conductive rubber. Information on displacement or position of the polymer actuator 22 can be obtained from the output value of the sensor obtained from the action of the sensor attending on the action of the polymer actuator 22.

The electromechanical conversion element of the sensor is favorably an ionic conductor layer or a pressure-sensitive conductive layer. It is favorable that the ionic conduction layer of the actuator and the electromechanical conversion element of the sensor are formed of the same materials, the electrodes of the actuator and the sensor are formed of the same materials, and the composition ratios of these materials are different.

Driving of Sensor

Both electrodes 28 of the sensor 23 are connected to the electric signal detection unit 26 through an electrode fixing terminal and a lead wire (both not illustrated).

The electric signal detection unit 26 detects electric output variation between the electrodes 28 holding therebetween the electromechanical conversion unit 33 of the sensor 23. The sensor 23 having an electrode/electromechanical conversion unit/electrode structure generates voltage attending on its shape change. The electromechanical conversion unit detects this voltage value.

When the voltage generated is minute and contains noise, the electromechanical conversion unit may be equipped with various mechanisms such as a filter and an amplifier. For example, for a direct current signal that is an electromotive voltage of the sensor 23, it is possible to adopt a method in which after a voltage is amplified by an amplifier, the signal is allowed to pass through an integrating circuit (primary low-pass filter) made by a resistance and a capacitor to remove noise.

The electrodes 28 of the sensor 23 are not always required to hold the electromechanical conversion element 33 between them and may be arranged side by side on one side of the electromechanical conversion unit 28. Such construction is also able to detect generation of an electromotive voltage between the electrodes, although the value detected is supposed to be decreased.

For a sensor detecting a change in resistance between electrodes like a pressure-sensitive conductive rubber, the electric signal detection unit 26 may be equipped with a mechanism for measuring a direct resistance from acquirement of a direct current (voltage) with respect to application of a direct voltage (current), or may be equipped with a mechanism for measuring an impedance from acquirement of an alternating current (voltage) to application of an alternating voltage (current). The unit may also be equipped with a mechanism capable of applying an arbitrary alternating frequency for the measurement of the impedance.

The use of such a sensor composed of the pressure-sensitive conductive rubber has the following advantage.

In the sensor detecting electromotive force attending on shape change of the ionic conductor layer containing an ionic substance such as an ionic liquid, it is supposed that electric charge polarization generating voltage is relieved with time. The voltage value detected by the sensor is not always retained when the displacement of the device is retained, and so the attenuation process of the voltage value needs to be taken into consideration in the control.

In the sensor composed of the pressure-sensitive conductive rubber, on the other hand, the resistance value detected is attributed to the shape of the sensor, and so it is supposed that the resistance value is retained without being attenuated even when the displacement of the device is retained. Consideration for the attenuation process of the resistance in the control is less required.

Relationship of Modulus of Elasticity Between Polymer Actuator and Sensor

In the present invention, an actuator region 29, in which the polymer actuator 22 is present, and a sensor region 30, in which the sensor 23 is present, are formed by selecting the materials and structures of the polymer actuator and sensor in such a manner that the sensor region 30 is more flexible than the actuator region 29.

The actuator region 29 and sensor region 30 respectively mean regions containing respective electrodes and polymer membranes right under the electrode forming surfaces, i.e., an actuator region having the electrodes and the ionic conduction layer and a sensor region having the electrodes and the electromechanical conversion element. The comparison of the flexibility is conducted by the average values of modulus of elasticity in the whole of the respective regions.

The modulus of elasticity is calculated as a value of the gradient $\delta/\in$=modulus of elasticity [MPa] from a tensile force [MPa]-strain ($\in$) [mm/mm] curve when measured by means of, for example, a tensile tester.

In the measurement of a film composed of a polymer membrane, the modulus of elasticity varies according to the glass transition temperature of the material and the environmental temperature upon measurement, so that an actual service temperature of the actuator with the sensor, for example, 25° C., is adopted as the environmental temperature upon measurement.

In the measurement of a composite film composed of a polymer membrane and electrodes, it is difficult to calculate the modulus of elasticity from the gradient δ/∈ because the characteristics of the respective membranes are reflected on the tensile force-strain curve. In such a case, the combined modulus may be calculated as [E (polymer membrane)·V (polymer membrane)+E (electrode)·V (electrode)] from the volume fraction of the components [V (polymer membrane), V (electrode)] by separately measuring the moduli of elasticity (E (polymer membrane), E (electrode)) of the respective membranes.

The smaller average value of modulus of elasticity indicates that such a region is more flexible. In order to vary flexibility between the respective regions, a method of using materials different in modulus of elasticity or a method of varying modulus of elasticity or compressibility between the structures by controlling porosity by a difference in membrane structure or composition ratio of the materials is considered.

The relationship between the modulus of elasticity (A) of the actuator and the modulus of elasticity (S) of the sensor satisfies S<A.

It is also considered to insert a material more flexible, i.e., lower in modulus of elasticity, than the component of the polymer actuator in at least a part of the electromechanical conversion element 33 and electrodes 28 of the sensor 23.

Such an inserting material may be arranged in any place such as in the ionic conduction layer, in the electrode layers or between the electromechanical conversion element (ionic conductor membrane) and the electrode layers.

When such an inserting material is present, the modulus of elasticity of the sensor region, in which the inserting material is present, is lower in terms of the average of the whole region even if the polymer actuator 22 and the sensor 23 are formed with the same materials except for the inserting material.

The modulus of elasticity of the actuator is expected to be about 10 Mpa to 1 Gpa according to selected materials. For example, an actuator used in Example 1, which will be described later, formed of an ionic conductor membrane obtained by filling 1-butyl-3-methylimidazolium tetrafluoroborate (BMIBF4), which is an ionic liquid, into a base material composed of a polyvinylidene fluoride-hexafluoropropylene copolymer (PVdF(HFP)), and electrodes obtained by mixing carbon nanotubes in the ionic conductor membrane exhibits a modulus of elasticity of from about 10 MPa to 200 MPa normally according to production conditions and lots.

The modulus of elasticity of the sensor may be arbitrarily selected within a range lower than the above value, and a very flexible material may be inserted therein.

The presence of the inserting material enables formation of an easily strainable portion in addition to giving flexibility. Thus, the sensor 23 can cause the region of the sensor itself to be more greatly strained upon minute action of the polymer actuator 22 by the presence of the inserting material, so that the detection sensitivity thereof can be improved.

When the inserting material is arranged in the ionic conductor membrane or between the ionic conductor membrane and the electrodes, such a material is favorably a material low in modulus of elasticity and having ionic conductivity. When the inserting material has ionic conductivity, the sensor can be used as a sensor detecting electromotive force.

When the inserting material is arranged in the electrode layers or between the ionic conductor membrane and the electrodes, such a material may be a material low in modulus of elasticity and change the conductivity according to strain. In such a case, it is supposed that an electromotive force value detected is amplified by change in conductivity depending on strain of the inserting material in the sensor region.

The sensor is favorably formed at a place on which stress of the polymer actuator easily concentrates. A polymer actuator exhibiting bending motion is partially fixed by the fixed end, so that the degree of freedom and actionability are controlled. The distribution of stress generated against displacement can be grasped by calculation when information such as shape (width, length, thickness and sectional form) of the actuator with the sensor, Young's moduli of the components and displacement quantity of the device has been acquired. When the sensor 23 is formed at a place where force easily concentrates in the stress distribution, the strain of the sensor can be made great to improve the detection sensitivity thereof.

Connection of Polymer Actuator to Sensor

The polymer actuator 22 is connected to the sensor 23 through the frame 24 as the connecting portion to provide an integral construction. The frame 24 may be formed with any material such as a plastic or polymer film, or a metal film. However, the film is favorably such a flexible film that the action of the polymer actuator 22 is not prevented. The frame favorably has a modulus of elasticity equal to (or lower than) that of the polymer actuator. Connection of the frame 24 to the polymer actuator 22 and the sensor 23 may be made by any of various methods such as thermo-compression bonding, adhesion and lamination.

The frame 24 has a role of transmitting stress produced by the action of the polymer actuator 22 to the sensor 23, and the sensor 23 changes its shape by the transmission of the stress.

The frame 24 may be the same membrane as the ionic conduction layer 32 of the polymer actuator 22 or the electromechanical element 33 of the sensor 23, or another membrane than those. The ionic conduction layer 32 and the electromechanical conversion element 33 are formed on the same plane (parallel arrangement) or in a lamination direction (laminated arrangement) through the frame 24. In the laminated arrangement, the electrodes 27 of the polymer actuator and the electrodes 28 of the sensor may be connected to each other through no frame. The electrode 27 and the electrode 28 may be a common one-plate electrode.

The connecting method is classified into the following patterns.

(1-1) Parallel Arrangement Through Connecting Portion

It is an actuator with a sensor of the construction according to the embodiment (1-1) of the present invention as illustrated in FIGS. 1A and 1B, in which an actuator having electrodes and an ionic conduction layer and a sensor having electrodes and an electromechanical conversion element are connected in parallel through a connecting portion (frame) provided between the actuator and the sensor.

As the connection of the parallel arrangement, are considered such constructions as (1) the ionic conduction layer 32, the electromechanical conversion element 33 and the frame 24 are different membranes from one another, (2) the frame 24 is a membrane common to either one of the ionic conduction layer 32 and the electromechanical conversion element 33, and (3) the frame 24 is a membrane common to both ionic conduction layer 32 and electromechanical conversion element 33.

In the construction (2), when, for example, the frame 24 and the ionic conduction layer 32 of the polymer actuator 22 are regarded as one common polymer membrane, the sensor 23 is formed on the frame 24 (namely, the ionic conduction layer 32). In the construction (3), when the frame 24, the ionic conduction layer 32 and the electromechanical conversion element 33 are regarded as one common polymer membrane, the polymer actuator 22 and the sensor 23 are formed on the same plane by patterning and arranging the respective electrodes on the common polymer membrane. In this case, the frame 24 is required to act as both polymer actuator and sensor, and the previously described ionic conductor membrane is mentioned as a favorable example. The frame 24 is favorably a membrane having an insulating structure capable of electrically isolating the polymer actuator 22 and the sensor 23 from each other so as not to cause superimposition of voltage (current) between the polymer actuator 22 and the sensor 23.

However, the following requirement as to flexibility should be considered for the frame 24. Supposing that the modulus of elasticity of the actuator is (A), the modulus of elasticity of the sensor is (S), and the modulus of elasticity of the interlayer region 31 of the frame 24, which is present between the actuator region and the sensor region 30, is (I), these moduli of elasticity favorably satisfy $S<I<A$, $S=I<A$, $S<I=A$, or $I<S<A$.

The interlayer region 31 means a region between just under a forming surface of the electrode 27 of the polymer actuator 22 and just under a forming surface of the electrode 28 of the sensor 23. '$S<A$' indicates that the sensor region is lower in the average value of the modulus of elasticity than the actuator region, i.e., more flexible.

In the relationship of the flexibility, in the case of $S<A<I$, which departs from the present invention, the presence of the frame 24 prevents the action of the polymer actuator 22 or is hard to transmit the stress of strain to the sensor 23.

In order to concentrate the stress of strain on the sensor 23, the construction having the relationship of $S<I<A$ or $S<I=A$ is favorable. In the case of having an ideal construction, it is supposed that there is some linearity between the displacement quantity of the polymer actuator 22 and the detected value of the sensor 23.

In the construction having the relationship of $I<S<A$, it is supposed that the stress of strain is more concentrated on the frame 24 than the sensor 23. Even in this case, it is supposed that there is some correlation between the displacement quantity of the polymer actuator 22 and the detected value of the sensor 23. However, it is supposed that the correlation becomes such a curved relation that the linearity saturates at a certain stage.

(1-2) Laminated Arrangement Through Connecting Portion

Figure 5A:
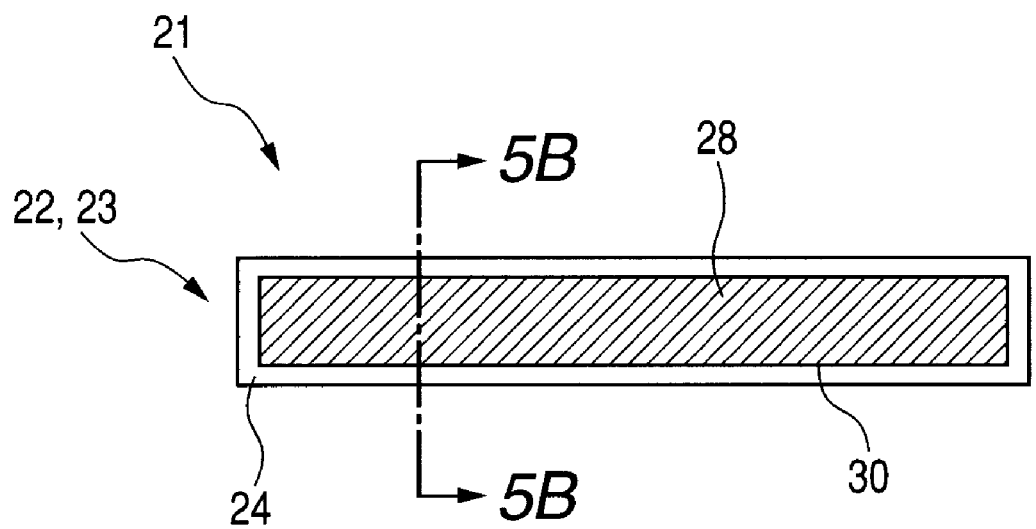
FIGS. 5A and 5B illustrate the construction of an actuator with a sensor according to another embodiment of the present invention.
Figure 5B:
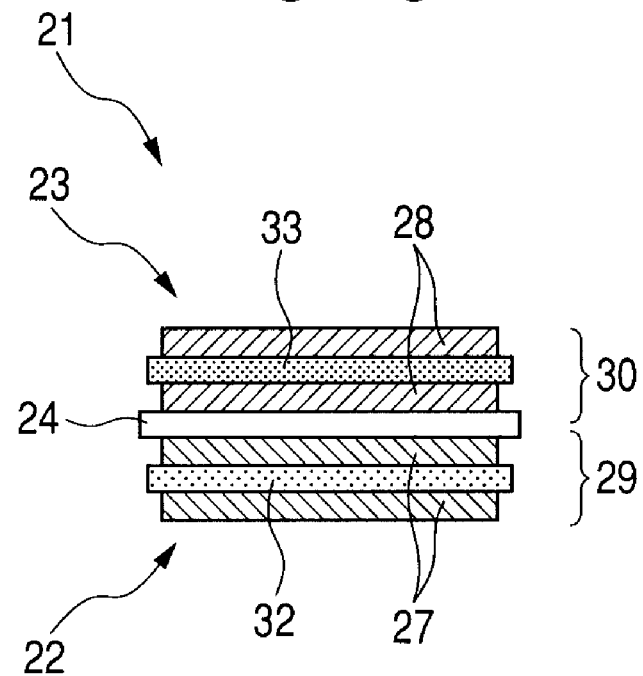

It is an actuator with a sensor of the construction according to the embodiment (1-2) of the present invention as illustrated in FIGS. 5A and 5B, in which an actuator having electrodes and an ionic conduction layer and a sensor having electrodes and an electromechanical conversion element are laminated and connected through a connecting portion (frame) provided between the actuator and the sensor.

As the connection in the laminated arrangement, the frame 24 is arranged between the polymer actuator 22 and the sensor 23.

(2) Directly Laminated Arrangement of Actuator and Sensor

Figure 7A:
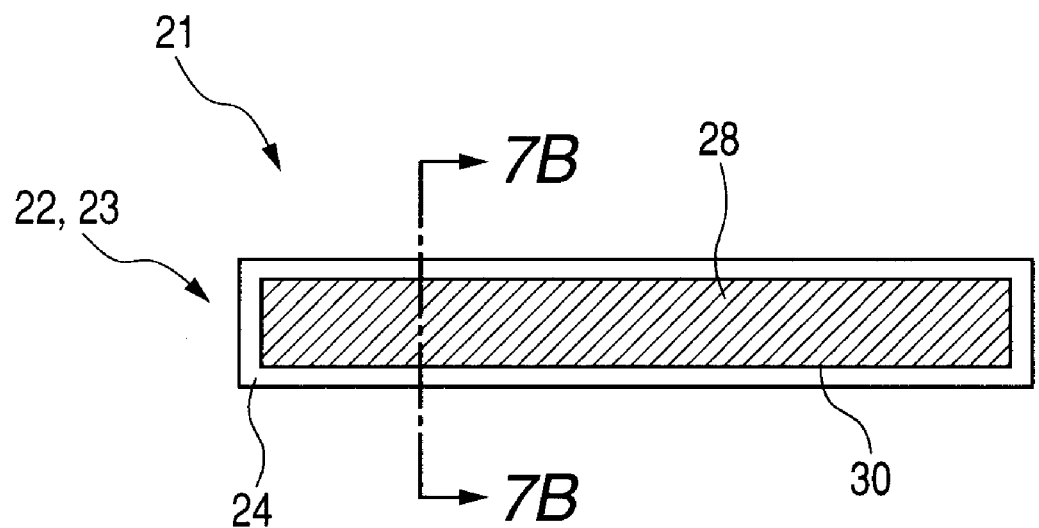
FIGS. 7A and 7B illustrate the construction of an actuator with a sensor according to a still further embodiment of the present invention.
Figure 7B:
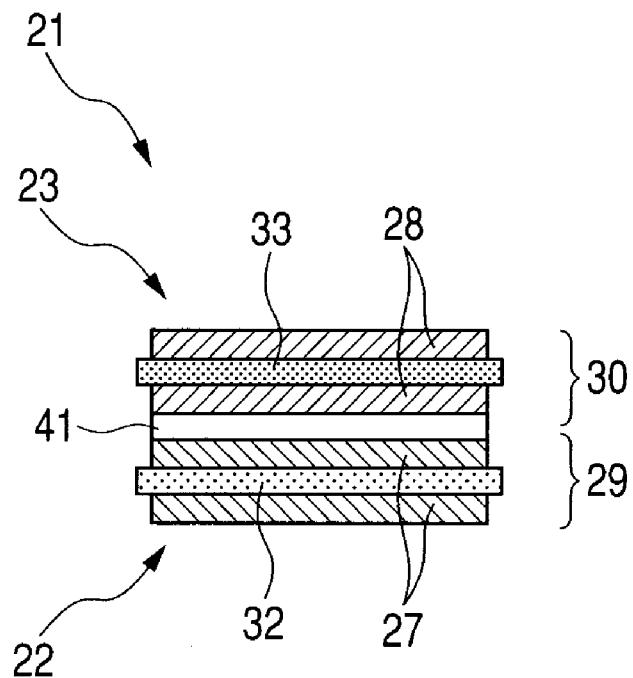

It is an actuator with a sensor according to the embodiment (2) of the present invention as illustrated in FIGS. 7A and 7B, in which an actuator having electrodes and an ionic conduction layer and a sensor having electrodes and an electromechanical conversion element are directly laminated, and wherein when the actuator is deformed, the sensor is also deformed, and wherein the relationship between the modulus of elasticity (A) of the actuator and the modulus of elasticity (S) of the sensor satisfies $S<A$.

As the connection in the case (2) where the actuator and the sensor are directly laminated, are considered such constructions (i) that the respective electrodes are bonded to each other without arranging the frame 24 between the polymer actuator 22 and the sensor 23, (ii) that one electrode is shared without arranging the frame 24 between the polymer actuator 22 and the sensor 23, and (iii) that the respective electrodes are bonded to each other through an insulating layer without arranging the frame 24 between the polymer actuator 22 and the sensor 23.

In the laminated arrangement, the relationship of modulus of elasticity between the components is important like the parallel arrangement. However, the definitions of the respective regions somewhat differ due to the difference in arrangement construction. Namely, the actuator region 29 is composed of the electrodes 27 and ionic conduction layer 32 of the polymer actuator, and the sensor region is composed of the electrodes 28 and electromechanical conversion element 33 of the sensor. The region between both regions is defined as an interlayer region 31.

The relationship in modulus of elasticity between the components in (1-2) laminated arrangement through connecting portion favorably satisfies $S<I<A$, $S=I<A$, $S<I=A$, or $I<S<A$.

When the actuator and the sensor are directly laminated as in (2), it is necessary to satisfy $S<A$ because no interlayer region is present. When no insulating layer is inserted, the connected site between the electrode 27 of the polymer actuator 22 and the electrode 28 of the sensor 23 is equipotential, so that an equipotential electrode is favorably used as a ground.

As for the range of the modulus of elasticity of each region, the modulus of elasticity (A) of the actuator (actuator region 29) is desirably 5 MPa or more and 1 GPa or less, favorably 10 MPa or more and 200 MPa or less.

When the modulus of elasticity (S) of the sensor (sensor region 30) is below 90% of the modulus of elasticity (A) of the actuator, the difference in modulus of elasticity is considered to be a significant difference in flexibility. Thus, the modulus of elasticity (S) is desirably 1 MPa or more and 900 MPa or less, favorably 5 MPa or more and 180 MPa or less.

The modulus of elasticity (I) of the connecting portion (interlayer region 31) is desirably 3 MPa or more and 950 MPa or less, favorably 10 MPa or more and 200 MPa or less.

The polymer actuator 22 and the sensor 23 may selectively have any form such as a circular, triangular, elliptical or rod-like flat plate, film, cylinder, helix or coil form in addition to the form of the rectangular flat plate within the above-described constructional features.

The ratio in size between the polymer actuator 22 and the sensor 23 may be arbitrarily selected. In order to more improve the action efficiency of the polymer actuator 22, it is favorable to make the size of the sensor 23 relatively small.

The sensor 23 may adopt such a construction that its thickness is smaller than the polymer actuator 22. Even when the sensor is formed of the same material as in the actuator, the bending radius of a film can be made smaller as the film thickness becomes smaller. This is particularly effective when the polymer actuator 22 and the sensor 23 are set in a laminated arrangement.

The polymer actuator 22 and the sensor 23 may adopt a composite structure composed of single or plural elements.

EXAMPLES

Examples of the present invention will hereinafter be described in more detail.

Example 1

An actuator with a sensor illustrated in FIGS. 1A and 1B was produced. In this example, the actuator with the sensor is integrally constructed by forming a polymer actuator 22 and a sensor 23 on a frame 24. The polymer actuator and the sensor have the construction of a parallel arrangement.

The polymer actuator is formed of an ionic conductor membrane obtained by filling 1-butyl-3-methylimidazolium tetrafluoroborate (BMIBF4), which is an ionic liquid, into a base material composed of a polyvinylidene fluoride-hexafluoropropylene copolymer (PVdF(HFP)), and electrodes obtained by mixing carbon nanotubes in the ionic conductor membrane.

The ionic conductor membrane is formed according to the following procedure. 100 mg of PVdF(HFP) (product of Kanto Chemical Co., Inc.), which is the base material, 100 mg of BMIBF4 (product of Kanto Chemical Co., Inc.), which is the ionic liquid, and 1 mL of N,N-dimethylacetamide (DMAc) (product of Kishida Chemical Co., Ltd.), which is an organic solvent, were heated and mixed at 80° C. The resultant mixed solution was poured into a mold (thickness: 0.1 mm) composed of PTFE followed by leveling with a blade, and the product was then dried at room temperature to obtain an ionic conductor membrane having an even thickness.

The electrodes are formed according to the following procedure. 50 mg of a single-layer carbon nanotube (SWNT, product of Carbon Nanotechnology Incorporated, "HiPco"), which is a conductive material, 100 mg of ionic liquid (BMIBF4) and 1 mL of an organic solvent (DMAc) were put in a container.

Zirconia balls having a particle size of 2 mm were added into the container up to one third of the capacity of the container to conduct a dispersion treatment under conditions of 200 rpm and 30 minutes using a ball mill (planetary type pulverizer manufactured by Fritsch Co.). A solution prepared by dissolving 80 mg of PVdF(HFP), which is the base material, in 2 mL of DMAc under heat was then added to conduct an additional dispersion treatment under conditions of 500 rpm and 30 minutes.

The resultant mixed solution was poured into a mold (thickness: 0.05 mm) composed of PTFE followed by leveling with a blade, and the product was then dried at room temperature to obtain an electrode, in which the conductive material was uniformly dispersed, and which had an even thickness.

The ionic conductor membrane and the electrodes were cut into shapes of 6 mm wide and 22 mm long, and 4 mm wide and 20 mm long, respectively, and the ionic conductor membrane and two electrodes were arranged so as to hold the central portion of the ionic conductor membrane between the electrodes in such a manner that the two electrodes did not come into contact with each other, and they were heat-bonded under pressure under conditions of 80° C., 0.4 MPa and one minute.

The thickness of the polymer actuator thus obtained was about 0.12 mm.

The sensor is formed of the same material as in the polymer actuator. However, the modulus of elasticity thereof is controlled by adjusting the composition ratio of the mixture. The ionic conductor membrane was formed by reducing the amount of PVDF(HFP), which is the base material, to 80 mg against the amounts of the respective materials used in the polymer actuator, thereby giving a more flexible structure. The electrodes were formed by reducing the amounts of SWNT and PVDF(HFP) to 40 mg and mg, respectively, thereby giving a more flexible structure.

The ionic conductor membrane and the electrodes were cut into shapes of 4 mm wide and 22 mm long, and 2 mm wide and 20 mm long, respectively, and the ionic conductor membrane and two electrodes were arranged so as to hold the central portion of the ionic conductor membrane between the electrodes in such a manner that the two electrodes did not come into contact with each other, and they were heat-bonded under pressure under conditions of 80° C., 0.4 MPa and one minute. The thickness of the sensor thus obtained was about 0.1 mm.

An ion conductive buffer layer obtained by filling an ionic liquid (BMIBF4) into a material lower in modulus of elasticity than PVdF(HFP) which becomes a base material may be formed between the electromechanical conversion element composed of the ionic conductor membrane and the electrode of the sensor.

A tensile and compression testing machine (MST-1, manufactured by Shimadzu Corporation) was used to measure modulus of elasticity of an individual film of each of the polymer actuator and sensor thus obtained.

Figure 2:
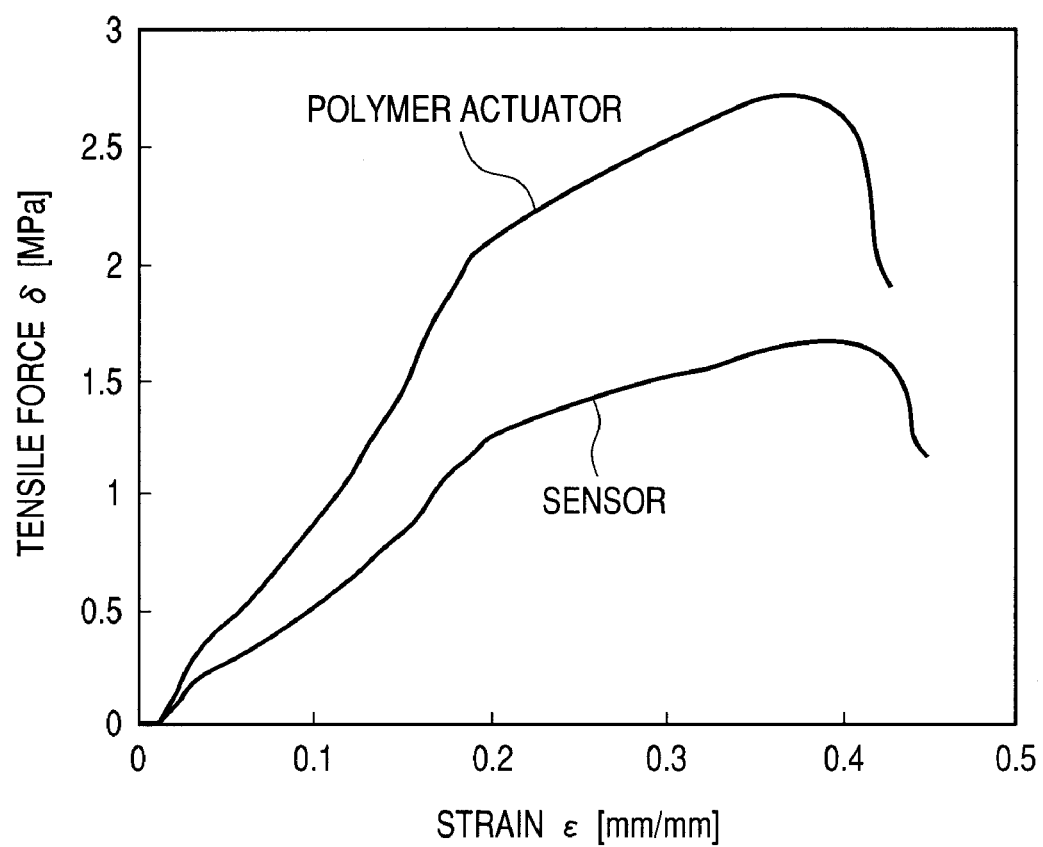
FIG. 2 diagrammatically illustrates evaluation as to moduli of elasticity of an actuator and a sensor used in Example 1 of the present invention.

FIG. 2 diagrammatically illustrates data of evaluation as to the modulus of elasticity and indicates the relationship between strain ($\in$) [mm/mm] and tensile force ($\delta$) [MPa] of each film. The tensile force is expressed as force per sectional area taking a difference in size into consideration. The modulus of elasticity [MPa] is calculated from the value of the gradient $\delta/\in$.

It is understood that in both polymer actuator and sensor, the strain $\in$ becomes greater as the value of the tensile force $\delta$ increases, and the tensile force $\delta$ rapidly decreases from a certain strain value. This rapid decrease in tensile force $\delta$ indicates a breaking or cutting point of the film, and the gradient (tensile force $\delta$/strain $\in$) until reaching this point was regarded as the whole average of the modulus of elasticity of each film. In FIG. 2, the modulus of elasticity of the sensor is about 7.5 MPa, the modulus of elasticity of the polymer actuator is about 12 MPa. The modulus of elasticity of the sensor (about 7.5 MPa) is lower than the modulus of elasticity of the polymer actuator (about 12 MPa), and so the sensor is more flexible than the polymer actuator.

The frame 24 is composed of a film using PVdF as a base material and is formed by adjusting the composition in such a manner that the modulus of elasticity thereof is between the moduli of elasticity of the polymer actuator and the sensor in FIG. 2. The modulus of elasticity is from about 7.5 MPa to about 12 MPa. In this example, the ionic conductor membrane of the polymer actuator is utilized as the frame, and so the modulus of elasticity of the frame is about 12 MPa.

The frame 24 is rectangular in the size of 12 mm wide, 24 mm long and about 0.1 mm thick, and portions in which the polymer actuator and the sensor are arranged are hollowed out. The ionic conductor membranes of the polymer actuator and the sensor are arranged so as to come into contact with the frame with an overlap width of 1 mm and provide an interval of 2 mm between the polymer actuator and the sensor, and integrated by thermo-compression bonding.

Figure 3A:
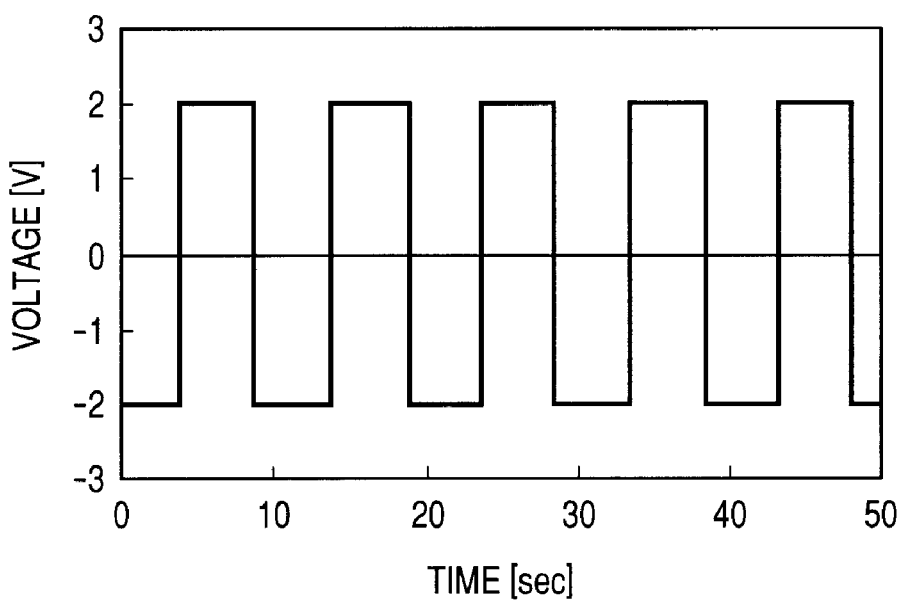
FIGS. 3A and 3B illustrate action characteristics of an actuator with a sensor used in Example 1 of the present invention.
Figure 3B:
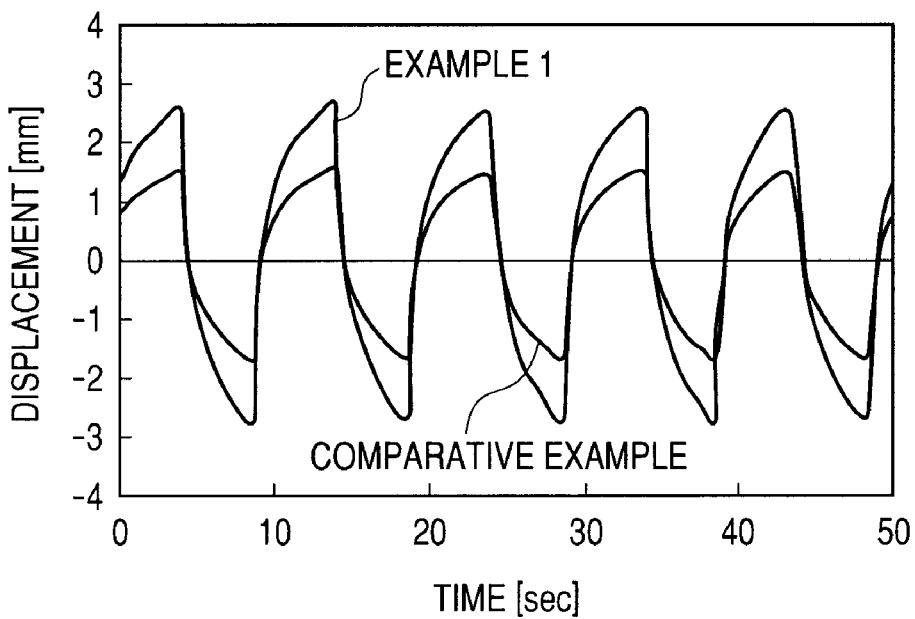

Difference in bending motion upon application of voltage to the polymer actuator of the actuator with the sensor in Example 1 was investigated. FIGS. 3A and 3B illustrate an application pattern (FIG. 3A) of voltage to the polymer actuator and the condition (FIG. 3B) of bending motion upon the voltage application.

Another actuator with a sensor in which the size and the shape are uniform and the polymer actuator and the sensor are formed of the same components as each other is provided as a comparative example. In the device of the comparative example, the sensor is formed with the same material composition as the polymer actuator for making the sensor uniform with the polymer actuator.

Voltage was applied by amplifying a signal from an arbitrary waveform generator (33220A, manufactured by Agilent Co.) by a current/voltage amplifier (HSA4014, manufactured by NF Circuit Design Block Corporation). The waveform was square wave, and an alternating voltage was applied at a reference voltage of 0 V, an amplitude of ±2 V and frequency of 0.1 Hz.

Evaluation as to displacement quantity of bending motion was conducted by a laser displacement meter (LK-G80, manufactured by KEYENCE CORPORATION). A set point of the polymer actuator was irradiated with laser beams to regard the change in measured distance between the set point and the laser displacement meter due to the bending motion as the displacement quantity of the polymer actuator. These data were synchronized by a recorder and obtained.

As apparent from FIG. 3B, the displacement quantity of the bending motion of the actuator with the sensor in Example 1 of the present invention is greater than that of the actuator with the sensor in the comparative example. This means that the prevention of action by the presence of the sensor is reduced and indicates that the action efficiency of the polymer actuator is improved by the construction of the present invention.

The electromotive voltage upon the input of displacement to the sensor of the actuator with the sensor in Example 1 of the present invention was also evaluated. Another actuator with a sensor in which the size and the shape were uniform and the polymer actuator and the sensor were formed of the same components as each other was provided as a comparative example.

Figure 4A:
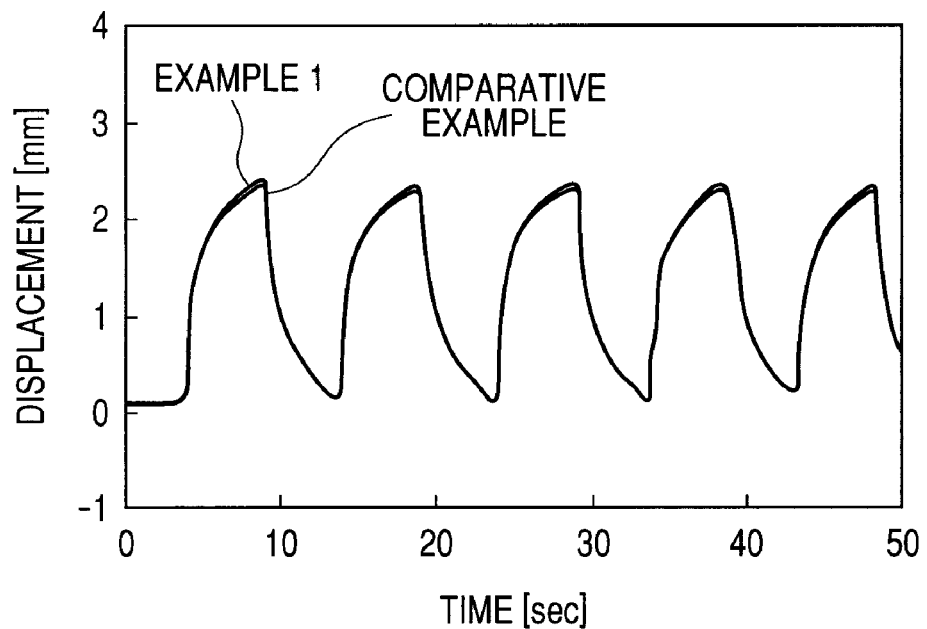
FIGS. 4A and 4B diagrammatically illustrate detection performance of electromotive voltage of the actuator with the sensor used in Example 1 of the present invention.
Figure 4B:
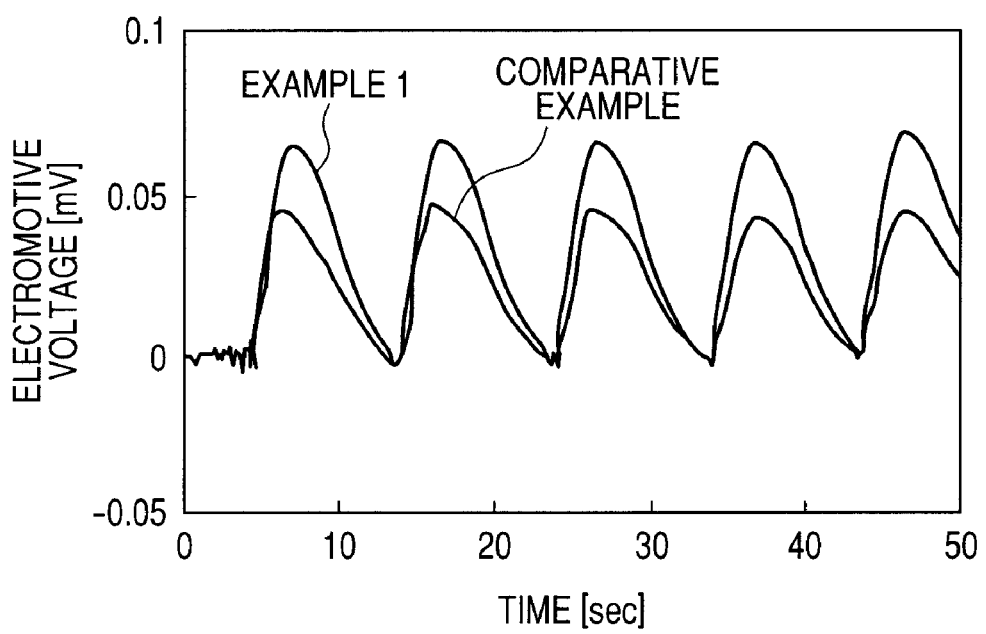

FIGS. 4A and 4B illustrate the relationship between displacement quantity (FIG. 4A) of the device and detected value (FIG. 4B) of the sensor when one end of the actuator with the sensor was fixed and the actuator was mechanically pushed from the outside at the other end to cause the actuator to conduct bending motion.

The mechanical pushing from the outside was conducted by a tensile and compression testing machine (MST-1, manufactured by Shimadzu Corporation), and a fixed pushing stroke was applied to the actuator with the sensor repeatedly. The displacement quantity at that time was measured by a laser displacement meter (LK-G80, manufactured by KEYENCE CORPORATION). The detection of electromotive voltage was conducted by means of POTENTIO/GALVANOSTAT (SI1287, manufactured by Solartron Co.). These data were synchronized by a recorder and obtained.

As apparent from FIG. 4B, the detected value of the sensor of the actuator with the sensor in Example 1 of the present invention is greater than that of the actuator with the sensor in the comparative example. This means that the sensor is more strained and indicates that the detection sensitivity of the sensor is improved by the construction of the present invention.

When the detected value of the sensor in the actuator with the sensor when the voltage is applied to the polymer actuator to cause the actuator to conduct bending motion is measured, correlation is observed between the displacement quantity and the detected value, whereby the displacement quantity of the polymer actuator can be monitored by the sensor.

By the construction of Example 1 of the present invention, in the actuator with the sensor obtained by integrally forming the polymer actuator and the sensor changing its shape following the action of the polymer actuator, the prevention of action by the presence of the sensor can be more reduced to more improve the action efficiency of the polymer actuator.

Incidentally, in the comparative example of the actuator with the sensor according to the present invention, the polymer actuator and the sensor were formed of the same materials. In this case, the displacement quantity became small by the prevention of action by the presence of the sensor as illustrated in FIGS. 3A and 3B. The detection sensitivity of the electromotive voltage upon the displacement of the sensor was also lowered as illustrated in FIGS. 4A and 4B.

Example 2

FIGS. 5A and 5B illustrate the construction of an actuator with a sensor of this example, in which FIG. 5A is an illustration viewed from the top, and FIG. 5B is a cross-sectional view taken along line 5B-5B in FIG. 5A.

In this example, the construction is the same as in Example 1 except that the integral construction is formed by arranging the polymer actuator 22 and the sensor 23 in a lamination direction with the frame 24 put between them.

The modulus of elasticity of the polymer actuator is about 12 MPa, and the modulus of elasticity of the sensor is about 7.5 MPa.

By adopting the above-described construction, in the device obtained by integrating the polymer actuator and the sensor changing its shape following the action of the polymer actuator, the prevention of action of the polymer actuator by the presence of the sensor can be more reduced to more improve the action efficiency of the polymer actuator. The detection sensitivity of the sensor can also be more improved by such a construction that the shape change of the sensor is more accelerated.

Example 3

Figure 6A:
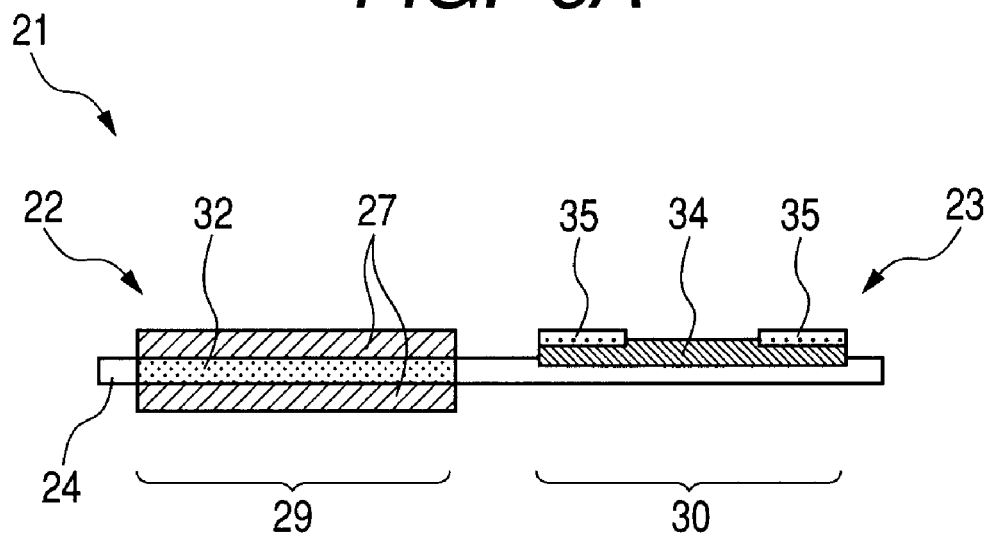
FIGS. 6A and 6B illustrate the construction of an actuator with a sensor according to a further embodiment of the present invention.
Figure 6B:
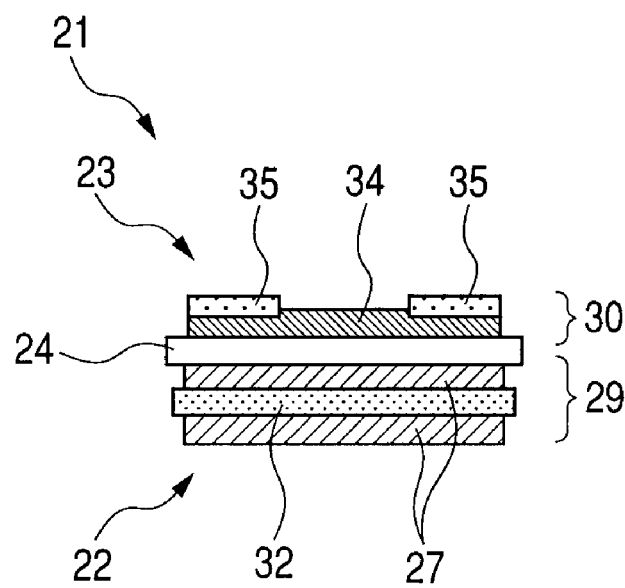

FIGS. 6A and 6B illustrate the construction of an actuator with a sensor of this example, in which FIG. 6A is a cross-sectional view in a parallel arrangement, and FIG. 6B is a cross-sectional view in a laminated arrangement.

In this example, the construction is the same as in Example 1 except that a sensor composed of a pressure-sensitive conductive rubber membrane 34 is used as the sensor.

The sensor 23 has such a construction that two resistance detecting electrodes 35 are bonded under pressure to a pressure-sensitive conductive rubber membrane 34 obtained by mixing carbon particles in a silicone rubber. The resistance detecting electrodes 35 may be formed with any material such as a metal foil or a material containing conductive particles formed of a metal or carbon so far as it is a flexible material high in conductivity. The sensor 23 detects a change in resistance between the resistance detecting electrodes 35.

The frame 24 is formed of a material having good adhesion to the ionic conduction layer 32 of the polymer actuator 22 and the pressure-sensitive conductive rubber membrane 34 used in the sensor 23.

The pressure-sensitive conductive rubber membrane of the sensor 23 is formed so as to have the whole average of modulus of elasticity lower than that of the actuator region composed of the ionic conduction layer 32 and electrodes 27 of the polymer actuator 22, whereby the modulus of elasticity of the sensor region becomes lower than that of the actuator region, i.e., the structure of the sensor region is more flexible than the actuator region.

The modulus of elasticity of the polymer actuator 22 is about 12 MPa, the modulus of elasticity of the sensor is about 5 MPa, and the modulus of elasticity of the frame is about 12 MPa.

The integral construction may be formed by arranging the polymer actuator 22 and the sensor 23 in a lamination direction with the frame 24 put between them.

A conductive buffer layer obtained by mixing fine particles of carbon or a metal in a material lower in modulus of elasticity than silicone rubbers which become a base material may also be formed between the pressure-sensitive conductive rubber membrane 34 and the resistance detecting electrode 35 of the sensor 23.

By adopting the above-described construction, in the device obtained by integrating the polymer actuator and the sensor changing its shape following the action of the polymer actuator, the prevention of action of the polymer actuator by the presence of the sensor can be more reduced to more improve the action efficiency of the polymer actuator. The detection sensitivity of the sensor can also be more improved by such a construction that the shape change of the sensor is more accelerated.

Example 4

FIGS. 7A and 7B illustrate the construction of an actuator with a sensor of this example, in which FIG. 7A is an illustration viewed from the top, and FIG. 7B is a cross-sectional view taken along line 7B-7B in FIG. 7A.

In this example, the construction is the same as in Example 2 except that the integral construction is formed by directly laminating and arranging the polymer actuator 22 and the sensor 23 without providing a frame.

The contact portion of the electrode of the polymer actuator 22 with the electrode of the sensor 23 is insulated by an insulating layer 41 formed of a coating film of a fluororesin. One electrode may be shared without arranging the insulating layer at the contact portion of the electrode of the polymer actuator 22 with the electrode of the sensor 23.

The modulus of elasticity of the polymer actuator is about 12 MPa, and the modulus of elasticity of the sensor is about 7.5 MPa.

By adopting the above-described construction, in the device obtained by integrating the polymer actuator and the sensor changing its shape following the action of the polymer actuator, the prevention of action of the polymer actuator by the presence of the sensor can be reduced to more improve the action efficiency of the polymer actuator. The detection sensitivity of the sensor can also be more improved by such a construction that the shape change of the sensor is more accelerated.

INDUSTRIAL APPLICABILITY

In an actuator with a sensor according to the present invention, the polymer actuator and the sensor changing its shape following the action of the polymer actuator are integrated, so that the action efficiency of the polymer actuator can be improved, and the detection sensitivity of the sensor can also be improved. Thus, the actuator with the sensor can be used as an actuator of a robot coming into contact with human and is required to have flexibility and safety, a hand or manipulator for robots, a driving source for various machines, and actuators for medical and welfare robots such as surgical devices and assist suits as well as for micro-machines.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-197415, filed Aug. 27, 2009, which is hereby incorporated by reference herein in its entirety.

What is claimed is:

1. An actuator with a sensor, comprising an actuator having a pair of electrodes and an ionic conduction layer present between the pair of electrodes, and a sensor having electrodes and an electromechanical conversion element, wherein when the actuator is deformed, the sensor is also deformed, and wherein a relationship between a modulus of elasticity (A) of the actuator and a modulus of elasticity (S) of the sensor satisfies S<A.

2. An actuator with a sensor, comprising an actuator having a pair of electrodes and an ionic conduction layer present between the pair of electrodes, a sensor having electrodes and an electromechanical conversion element, and a connecting portion provided between the actuator and the sensor and connecting the actuator to the sensor, wherein when the actuator is deformed, the connecting portion and the sensor are also deformed, and wherein a relationship among a modulus of elasticity (A) of the actuator, a modulus of elasticity (S) of the sensor and a modulus of elasticity (I) of the connecting portion satisfies S<I<A, S=I<A, S<I=A, or I<S<A.

3. The actuator with the sensor according to claim 2, wherein the actuator having the electrodes and the ionic conduction layer and the sensor having the electrodes and the electromechanical conversion element are connected in parallel through the connecting portion provided between the actuator and the sensor.

4. The actuator with the sensor according to claim 2, wherein the actuator having the electrodes and the ionic conduction layer and the sensor having the electrodes and the electromechanical conversion element are laminated and connected through the connecting portion provided between the actuator and the sensor.

5. The actuator with the sensor according to claim 1, wherein the actuator having the electrodes and the ionic conduction layer and the sensor having the electrodes and the electromechanical conversion element are directly laminated, and wherein when the actuator is deformed, the sensor is also deformed.

6. The actuator with the sensor according to claim 1, wherein the actuator has a modulus of elasticity (A) of 5 MPa or more and 1 GPa or less, and the sensor has a modulus of elasticity (S) of 1 MPa or more and 900 MPa or less.

7. The actuator with the sensor according to claim 1, wherein the connecting portion provided between the actuator and the sensor has a modulus of elasticity (I) of 3 MPa or more and 950 MPa or less.

8. The actuator with the sensor according to claim 1, wherein the electromechanical conversion element of the sensor is formed of one of an ionic conductor layer and a pressure-sensitive conductive layer.

9. The actuator with the sensor according to claim 1, wherein the ionic conduction layer of the actuator and the electromechanical conversion element of the sensor are formed of the same materials and the electrodes of the actuator and the sensor are formed of the same materials in which the composition ratios of these materials are different.

* * * * *